June 14, 1949.                M. B. HERBRICK                2,472,828
                           TIRE CHAIN RELEASE DEVICE
                              Filed Feb. 9, 1948

INVENTOR.
Milton B. Herbrick
BY
ATTORNEY

Patented June 14, 1949

2,472,828

UNITED STATES PATENT OFFICE 2,472,828

TIRE CHAIN RELEASE DEVICE

Milton B. Herbrick, Sterling, Colo.

Application February 9, 1948, Serial No. 7,146

1 Claim. (Cl. 152—213)

My invention relates to a tire chain device.

An object of my invention is to provide a release device which will allow a tire chain to be released from a tire, and whereby the inner side chain can be conveniently removed.

A further object of my invention is to provide means for releasing the inner chain in a simple arrangement which requires very few parts, and which works cooperatively with the end cross chain for the releasing function.

A further object of my invention is to provide a device having the above characteristics which can be readily attached, or detached.

Figure 1:
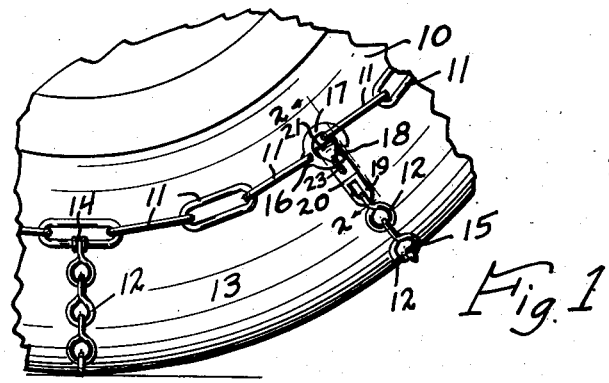
Figure 2:
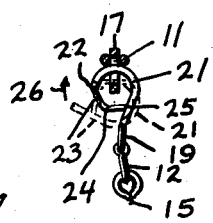
Figure 3:
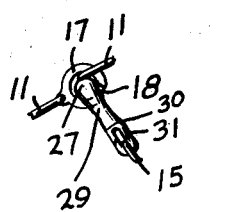
Figure 4:
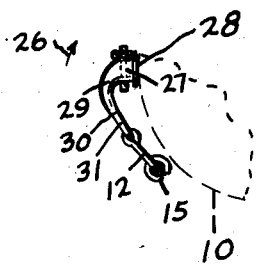

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1 is a side elevation of one form of the releasing device as observed from the inside of a tire, Figure 2 is a sectional detail taken along the lines 2—2 of Figure 1, Figure 3 is a modification, and Figure 4 is a side view of Figure 3.

My invention contemplates a simple arrangement for detaching the inner, annular side chain of a tire chain arrangement, which arrangement is operatively connected with one of the cross chains.

I have used the character 10 to designate the inner side wall of a tire casing, or the side which is facing away from the outside of the vehicle. I have further used the character 11 to designate a series of chain links which provide the inner side chain of the chain arrangement, and I have used the character 12 to designate the usual cross links which straddle the tire 13, such cross links being attached at 14 to either side, it being understood that a further series of links 11 are positioned on the outside of the tire. I have further used the character 15 to designate the end cross chains including the aforesaid twisted links 12. The cross chains 15 are attached at their outer ends to the commonly used ring or clamp, which provide attaching means for attachment to the end link 11 of the outside chain. This construction is well-known in the art and need not be illustrated herein.

One of the end links 11 is attached at 16 to the ring shaped member 17 having an opening at 18. Attached to an end link 12 of the cross chain is a keeper link 19 which is attached at 20 to the arcuate cam or wedging member 21 which is approximately as wide as the inner diameter of the ring 17. Attached at 22, or extending from the wider portion 21 is the considerably reduced portion 23 which is bent at 24, and is attached at 25 to the member 21.

Figure 1 illustrates the arrangement as attached, and with the further end link 11 being firmly held within the ring member 17 due to the fact that the expanded portion 21 has compressed the end link 11 within the member 17, the member 21 being held securely in this position due to the fact that the cross chain member 15 is attached in place.

However, when it is desired to remove the chain from the tire, the outer end of the cross chain 15 is detached from the outer side wall chain, and next, the operator will then be allowed to swing the member 21 in the direction of the arrow 26 until the reduced portion 23 is within the ring 17. This operation will allow the right hand link 11 as shown in Figure 1 to be removed through the opening 18, thereby releasing the inner side wall chain, whereby the chain can be removed. This, then, provides a simple means for releasing the inner side wall chain, and if desired, the arrangement in some cases can be swung by means of the cross chain itself, or by grasping the member 19.

A further modification of this arrangement is shown in Figures 3 and 4 wherein the same ring 17 is employed and having the opening 18 and with the links being attached in the same manner. In this arrangement however a member having a circular cross section and which is indicated by the character 27 at its greatest cross section is used, and terminates in the expanded head 28 which bears against the tire casing 13. The portion 27 continues into the reduced portion 29 which is substantially arcuate as shown, the lower end of which is attached at 30 to a further link or keeper 31 which in turn is attached to the links 12 of the cross chain. In this latter construction, when it is desired to release the side wall chains, after the cross chain 15 is released, the members 29 and 27 are pivoted in the direction of the arrow 26 whereby the reduced portion 29 will enter into the ring 17, allowing the link 11 to be released through the opening 18 in the same manner as described above.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A tire chain release device including an inner side chain divided and forming two end portions, a cross chain, and clamp means including a ring connected to one end portion of the inner side chain, said ring having a releasing opening, said ring receiving a link of the other end portion of the side chain, wedging members received in said ring adapted to snugly retain said link within said ring member, said wedging members having reduced portions, and being attached to said cross chain whereby release of said cross chain will provide means for reception of said reduced portions within said ring to allow release of said link through said releasing opening for releasing said inner side chain from a tire.

MILTON B. HERBRICK.

No references cited.